United States Patent [19]

Yanofsky et al.

[11] 4,172,660
[45] Oct. 30, 1979

[54] COPYING APPARATUS COVER

[75] Inventors: Daniel N. Yanofsky, Jericho, N.Y.; Victor L. Pluznick, Huntington Beach, Calif.

[73] Assignee: Pitney-Bowes, Inc., Stamford, Conn.

[21] Appl. No.: 866,662

[22] Filed: Jan. 3, 1978

[51] Int. Cl.² .......................... G03B 27/62; E05F 1/12
[52] U.S. Cl. .............................................. 355/75; 16/190
[58] Field of Search ................ 355/25, 75, 76; 16/190

[56] References Cited

U.S. PATENT DOCUMENTS

| | | | |
|---|---|---|---|
| 2,494,282 | 1/1950 | Campbell | 355/93 |
| 3,615,134 | 10/1971 | Newcomb | 355/75 |
| 3,807,856 | 4/1974 | Rodriguez | 355/25 X |
| 3,997,265 | 12/1976 | Menon et al. | 355/75 |

Primary Examiner—Donald A. Griffin
Attorney, Agent, or Firm—Martin D. Wittstein; William D. Soltow, Jr.; Albert W. Scribner

[57] ABSTRACT

In an electrophotographic copying apparatus, a cover and document keep device comprises a rigid cover cooperating with a pivoting arm linkage to maintain substantially parallel alignment of the cover with the platen surface regardless of the thickness of the original document to be copied, thereby providing an effective shield against radiation emitted by the copier exposure source. A plurality of anchoring means are formed in a recessed region of the copying apparatus housing. A resiliently biased arm link is slidably pivotally mounted to the anchoring means and pivotally mounted to the rigid cover to allow the cover to remain substantially parallel with the platen surface through a range of document thicknesses. Another feature of the invention allows the rigid cover to remain pivotally raised above the platen surface without user assistance. A projection on the rigid cover makes frictional engagement with a wall of the recessed region in the copier housing to hold the cover resiliently biased in a raised position.

8 Claims, 10 Drawing Figures

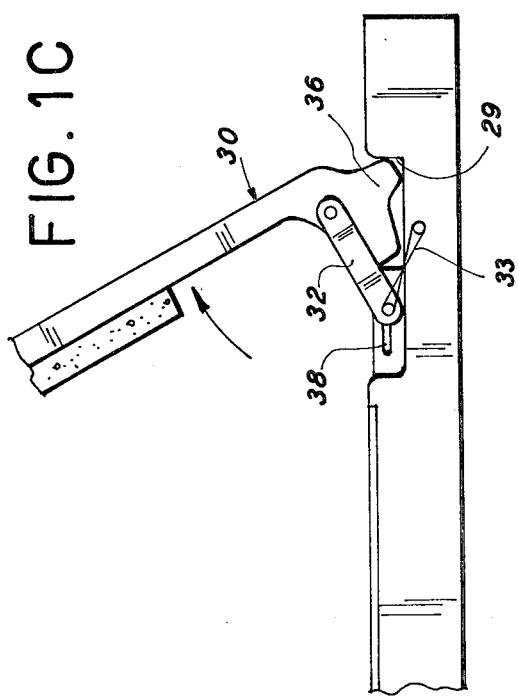
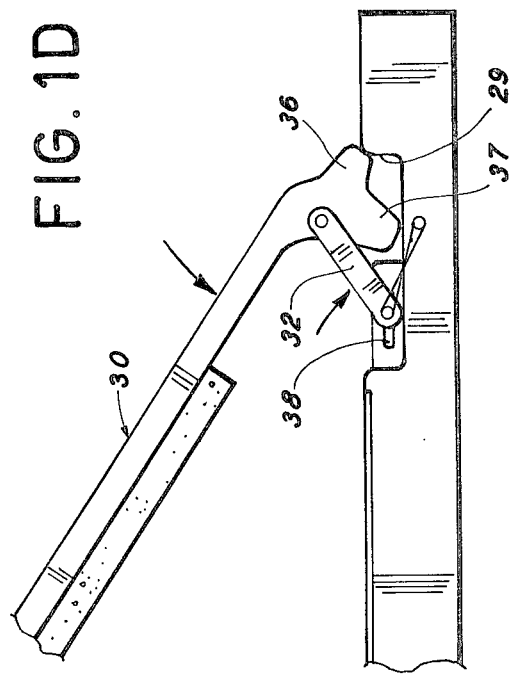
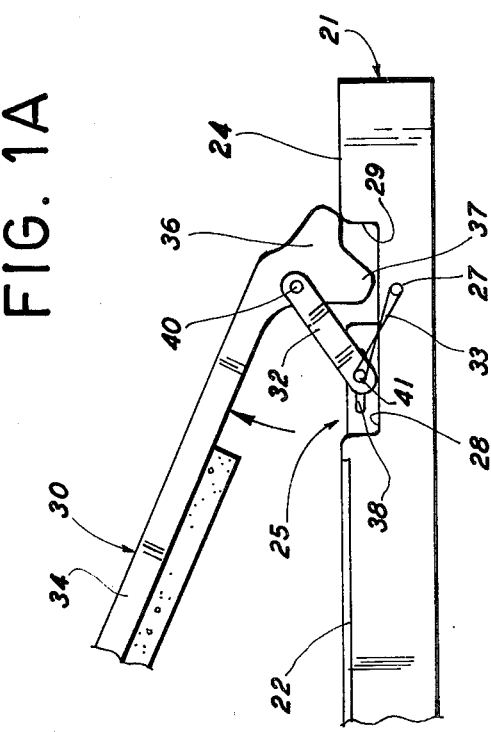
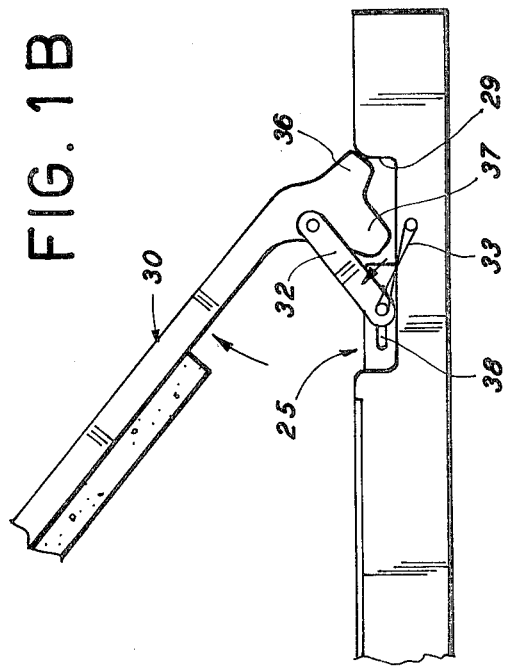

COPYING APPARATUS COVER

BACKGROUND OF THE INVENTION

Methods of reproducing copies of original documents have been known for many years, and steady progress has been made in electrophotographic copier design in order to improve copier speed and quality of the reproductions. Original documents may be reduced, enlarged or reproduced in color using present engineering technology.

One of the problems encountered in working with copier technology advancements is determining how to deal with the higher levels of radiation emitted by the higher energy exposure source necessary to accomplish the improved results. As the eye is especially susceptible to damage from high levels of visible or ultraviolet radiation, modern copiers must provide effective protection for the user from the visible and ultraviolet radiation given off by the copier exposure source.

Nearly all copiers give effective radiation protection when single sheets or very thin original documents are being copied, since the copier cover can completely overlie the platen or exposure surface. Difficulties arise when thick documents such as books are to be copied, making it impossible for the copier cover to lie flat against the platen surface. Fixed hinge copier covers must then remain in a partially open position, thereby exposing a portion of the platen surface and allowing radiation to reach the user's eyes.

It has been found that if the copier cover can be made to remain parallel with the platen exposure surface regardless of the thickness of the document to be copied, the most effective position for radiation protection is provided. This parallel alignment of the copier cover with the platen surface also provides a uniform downward pressure on the original document and aids in keeping it in place during the copying cycle. Important aspects of photographic copier construction and radiation shielding are discussed in U.S. Pat. No. 4,053,223, Nebiker et al.

Modern copiers are often manufactured with large platen surfaces in order to accommodate large original documents. Consequently, copier covers must be enlarged correspondingly in order to cover the platen or exposure surface. This increase in size often means an increase in weight, thereby making it advantageous to have some sort of counterbalance system in order to aid the user in raising and lowering the copier cover and also to allow the cover to remain in an open position without user supervision. This latter feature can also be utilized in relatively small platen copiers in order to free both of the user's hands for careful placement of the original document on the platen surface.

The following United States patents are thought to be pertinent:

| Inventor | Issue Date | Patent No. |
| --- | --- | --- |
| Barnes et al | 1932 | 1,866,874 |
| Martin | 1937 | 2,088,067 |
| Schwaneke | 1956 | 2,732,580 |
| Cossin | 1956 | 2,758,454 |
| Papsdorf | 1962 | 3,044,106 |
| Youngdale | 1962 | 3,066,349 |
| Carbon | 1968 | 3,377,942 |
| Roberts | 1972 | 3,682,348 |
| Kanno et al | 1973 | 3,724,949 |
| Goshima et al | 1976 | 3,994,582 |
| Menon et al | 1976 | 3,997,265 |

Kanno, Goshima, and Menon deal with electrophotographic copier cover design but differ from the present invention either in their implementation or in the results of their operation. Kanno uses elaborate mechanical and electrical systems to automatically position the copier cover over the original document. Goshima utilizes a flexible cover member cooperating with a pivotal expanding member in order to accommodate various original document thickness. A large cover-balancing spring means is also provided to allow the copier cover to remain in an open position. Menon describes the use of a large holder cover assembly for providing radiation protection. An inner member through cooperation with a system of sliding linkages provides uniform pressure to the document to be copied.

Barnes, Martin, Schwaneke, Cossin, Papsdorf, Youngdale, Carbon and Roberts represent the results of a search of other art fields in order to determine whether systems exist for maintaining substantially parallel alignment between two plates while varying the distance between them. Barnes describes an electric toasted sandwich maker with a vertically movable cover for accommodating various sandwich thicknesses. A plurality of positioning rods carried by the cover is received by a plurality of positioning detents vertically disposed along support members. The apparatus described in Barnes therefore is only vertically positionable at a predetermined number of locations. Martin describes the use of a positioning rod passed through a skewed, flexible, frictional ring to provide frictional holding of the positioning rod in one particular direction. Schwaneke illustrates a hinge for a cooking device with the cover maintaining parallel alignment with the lower surface by sliding within a vertical track. Cossin shows a closure system for a refrigerating apparatus utilizing a slotted support structure cooperating with a spring means. Papsdorf illustrates a cover attaching assembly utilizing a plurality of pivoting expanding link members. Youngdale describes a complicated mechanical hinged construction. Carbon illustrates an electric waffle iron incorporating covers with two possible vertical positions. Roberts describes a hinge assembly which allows a cover to remain parallel to a lower surface but, like Barnes, limits the number of vertical positions available.

A search of the prior art in both related and other areas has thus failed to discover a system of cover operation and construction similar to that used in the present invention.

It is therefore a principal object of this invention to provide a copier cover which acts as an effective user radiation shield by maintaining substantially parallel cover alignment with the platen surface regardless of original document thickness.

It is an additional principal object of this invention to provide a suitable hinge means which allows the copier cover to remain open without user supervision.

It is another object of this invention to provide the foregoing objects in a copier cover which is both economical and simple to construct.

The invention accordingly comprises the features of construction, combinations of elements and arrangements of parts which will be exemplified in the constructions hereinafter set forth, and the scope of the invention will be indicated in the claims.

SUMMARY OF THE INVENTION

The present invention defines a copying apparatus cover and document keep device providing ease in operation and effective radiation shielding.

In one embodiment a rigid cover member is pivotally mounted on either side of the cover to an arm link which in turn is slidingly pivotally mounted to a slotted flange. The slotted flange is preferably formed in a recessed portion of the copying apparatus housing. A spring means extends from each arm link to an anchor, preferably also formed in the recessed portion of the copying apparatus housing. A horizontally projecting portion of the rigid cover member comes into engagement with a side wall of the copying apparatus housing recess when the cover member is pivoted away from contact with the platen surface. The spring means maintains sufficient frictional engagement between the horizontal projection of the cover member and the side wall of the copier housing recess to allow the cover member to remain in a raised position without user assistance. The sliding pivoting arm links allow the cover member to remain substantially parallel with the platen surface regardless of the thickness of the documents to be copied.

In an alternate embodiment, the arm links incorporate a slot which communicates with a link having one end slidably engaged within the slot in the arm link and the other end pivotally mounted to an anchor preferably formed in the copier housing recess. The spring means extends from the arm link to an anchor as in the first embodiment and acts to hold the cover member in a raised position when it is pivoted away from the platen surface.

For a fuller understanding of the nature and objects of the invention, reference should be had to the following detailed description taken in connection with the accompanying drawings in which:

FIG. 1A is an enlarged fragmentary side elevational view of the copying apparatus cover and document keep device shown in FIG. 1, illustrating one partially open position;

FIG. 1B is an enlarged fragmentary side elevational view of the copying apparatus cover and document keep device shown in FIG. 1, illustrating another partially open position;

FIG. 1C is an enlarged fragmentary side elevational view of the copying apparatus cover and document keep device shown in FIG. 1 in its open position;

FIG. 1D is an enlarged fragmentary side elevational view of the copying apparatus cover and document keep device shown in FIG. 1, illustrating a partially closed position.

DETAILED DESCRIPTION

Figure 1:
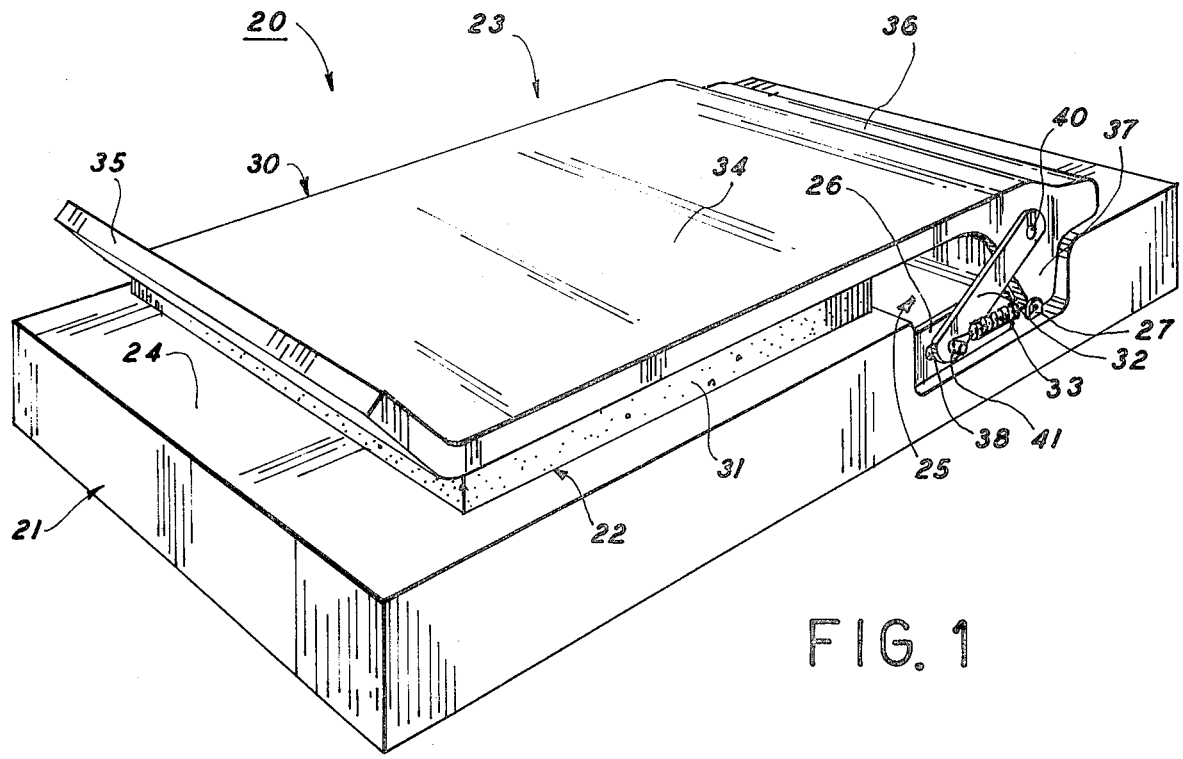
FIG. 1 is a perspective view of a copying apparatus cover and document keep device.
Figure 2:
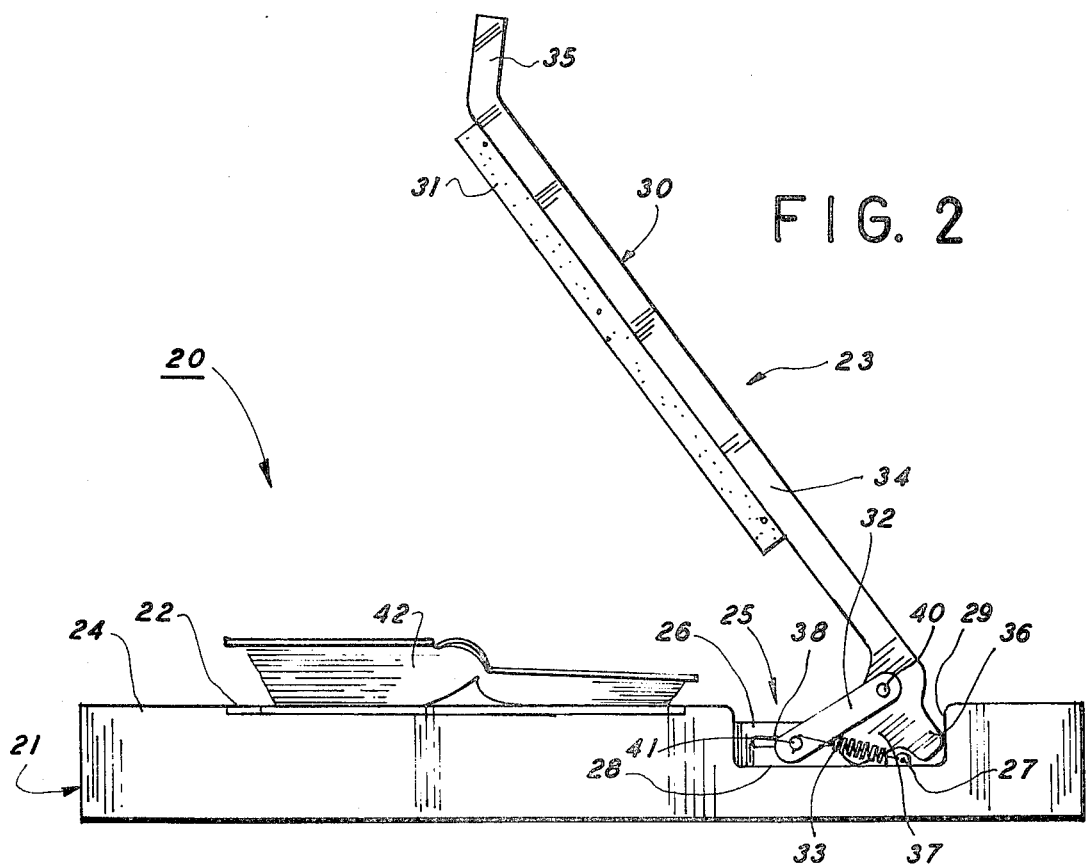
FIG. 2 is a side elevational view of the copying apparatus cover and document keep device shown in FIG. 1 in its open position.

In FIGS. 1 and 2 there is shown a portion of an electrophotographic copying apparatus 20 comprising a housing 21, a platen surface 22, and a cover assembly 23.

The housing 21 comprises a substantially flat top portion 24 and a recessed region 25 formed in the housing 21. The recessed region 25 incorporates a base surface 28 and a side wall 29 and may extend through the copier housing 21 from front to back as viewed by the user.

Along the base surface 28 of the recessed region 25, near the front edge of the copier housing 21, is disposed a flange 26 having a slot 38. Adjacent to the slotted flange 26 along the base region 28 of the recessed region 25 is disposed an anchor 27. Preferably, an identical slotted flange and anchor are similarly disposed within the recessed region 25 near the rear edge of copier housing 21, as viewed by the user.

The platen surface 22 is formed as a part of the top surface 24 of the housing 21 and forms a contiguous substantially level surface flush with the top surface 24. The platen 22 is manufactured of glass or other transparent material to allow documents placed on the platen surface 22 to be exposed to the electrophotographic exposure and reproduction equipment within the electrophotographic copier 20.

The cover assembly 23 comprises a rigid cover member 30, a document retaining pad 31, an articulating arm link 32 and a spring means 33.

The rigid cover member 30 incorporates a substantially flat platen-covering portion 34. One end of the cover member 30 forms an upwardly slanting handle 35 which aids in the raising and lowering of the cover 30. At the end of the cover 30 opposite the handle 35, is formed a plurality of positioning flange means comprising a horizontally extending shoulder 36 and at least one downwardly extending leg 37. The document retaining pad 31 is manufactured of a compressible foam-type material and is mounted to the underside of a cover member 30 and contacts the platen surface 22 when the cover assembly 23 is in a closed position. The document retaining pad 31 prevents the document to be copied from sliding while in contact with the platen surface 22.

The arm link 32 is pivotally mounted to the side of the cover member 30 near the positioning flange means end by means of a first pivot pin 40. This will hereinafter be referred to as the primary pivot. The other end of the arm link 32 is slidingly pivotally mounted within the slot 38 of the slotted flange 26 by means of a second pivot pin 41, hereinafter referred to as the secondary pivot. An identical arm link (not shown) is similarly mounted to the opposite side of the cover member 30 and to the slotted flange located near the rear edge of the copier housing 21. The spring means 33, shown in the drawings as a tension coil spring, is mounted at one to the pin 41 and at the other end to the anchor 27 in the recessed region 25 of the copier housing 21. An identical spring means (not shown) is similarly mounted near the rear edge of the copier housing 21. Other types of spring or tension means could be used as well. The operation of the copier cover assembly 23 will now be described.

OPERATION

When a single sheet or thin original document is to be copied, the user grasps the handle 35 of the rigid cover member 30 and exerts an upward pressure. This upward pressure causes the cover member 30 to pivot about the primary pivot pin 40. As the cover member is pivoted about the primary pivot pin 40, the horizontal shoulder 36 comes in contact with the top surface 24 of the copier housing 21, as indicated in FIG. 1A. Further pivoting allows the horizontal shoulder 36 to act as a type of cam causing the cover member 30 to ride up on the shoulder 36, as shown in FIG. 1B.

The camming action of the horizontal shoulder 36 causes the entire cover member 30 to be displaced vertically thereby causing the arm link 32 to pivot counterclockwise about the secondary pivot pin 41. This secondary pivoting action of link 32 about pin 41 causes the entire cover member 30 to move up to the left causing the horizontal shoulder 36 to drop down into the recessed region 25 of the copier housing 21, as shown in FIG. 1C. In the embodiment shown, the shoulder 36 will drop down into the recessed region 25 when the angle between the cover member 30 and the platen surface 22 exceeds 75 degrees. The horizontal shoulder 36 is shown within the recessed region 25 in FIGS. 1C and 2.

When the shoulder 36 is within the recessed region 25, the spring means 33 operates in the following manner to allow the cover member 30 to remain in any number of raised positions without user assistance. With the cover in its fully raised position as shown in FIGS. 1C and 2, the spring means 33 need be under little or no tension corresponding to the sliding pivot pin 41 at its right most limit of travel within slot 38. As the cover member starts to move downward, either by the force of gravity or by pressure from the user, the leg 37 will contact the base 28 of the recessed region 25, acting as a rolling pivot. The shoulder 36 will also act as a cam along the side wall 29, forcing the cover member 30 and link member 32 to the left. The pivot pin 41 sliding to the left within slot 38 increases the tension of the spring means 33, thereby urging the cover member to the right. This creates a frictioning engagement between the shoulder 36 and the side wall 29 and acts to hold the cover in its fully raised position. This frictional engagement also allows the cover member 30 to remain unattended in a number of other positions.

As the cover member 30 is pivoted downwardly from its fully raised position, the rolling pivoting action of downward leg 27 in contact with the base surface 28 of the recessed region 25 causes the horizontal shoulder 36 to cammingly slide vertically up the side wall 29 of the recessed region 25, as shown in FIG. 1D. As described previously, the camming action of the shoulder 36 creates the tension of the spring means 33 sufficient to counterbalance the weight of the cover member 30 and hold it in a raised position. When the cover member 30 is lowered to a certain point, the shoulder 36 is no longer in contact with the side wall 29 of the recessed region 25. The shoulder 36 then slips over the top of wall 29 and out of the recessed region 25, allowing the spring means 33 to pull the entire cover member 30 to the right. The cover member 30 then returns to contact the platen surface 22 thereby returning the cover assembly 23 to its closed position.

Figure 3:
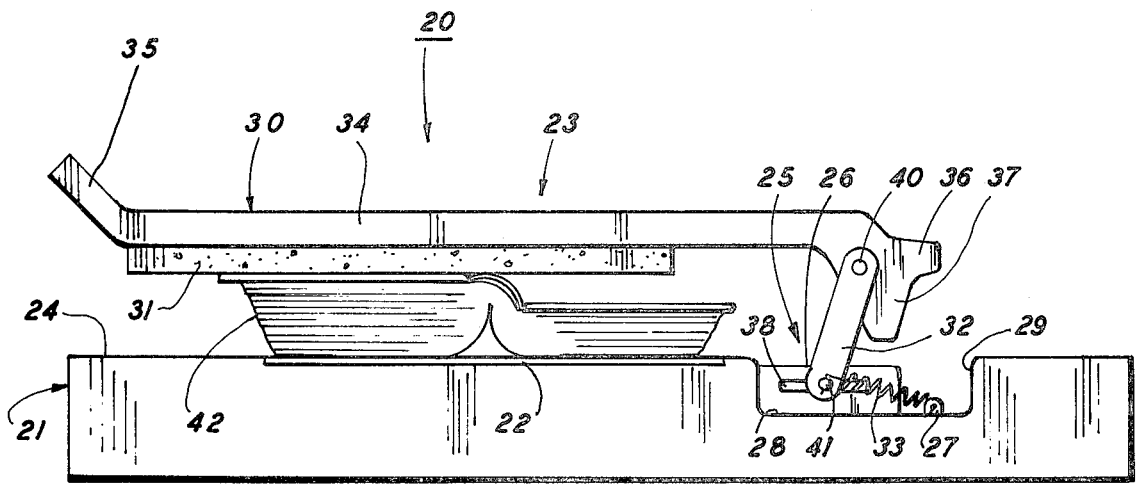
FIG. 3 is a side elevational view of the copying apparatus cover and document keep device shown in FIG. 1, in its closed position overlying a thick book exposed open for copying on the platen.

When a page from a book or a thick document is to be copied, the operation of the cover assembly 23 is somewhat different. By referring to FIGS. 2 and 3, that operation will now be described.

Figure 4:
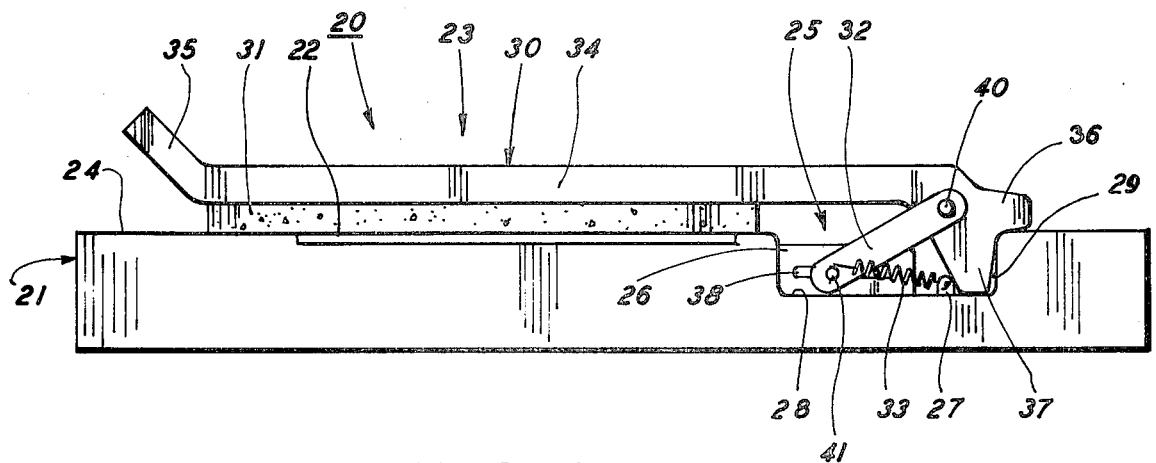
FIG. 4 is a side elevational view of the copying apparatus cover and document keep device shown in FIG. 1 in its closed copying position overlying a thin document, or in its closed storage position.

FIG. 2 illustrates the cover member 30 in its raised position, with a book 42 placed on the platen surface 22. With a book 42 or thick document in place, the cover member 30 is lowered to contact it. Depending on the thickness of the book 42, the shoulder 36 may or may not slip out of the recessed region 25 before the cover member 30 comes in contact with the book 42. It is possible also to grasp the handle 35 of the cover member 30 when the cover assembly 23 is in its closed position as shown in FIG. 4 and raise the cover member 30 sufficiently high enough to allow a book to be placed on the platen surface 22 but not high enough to allow the shoulder 36 to fall into the recessed region 25.

Regardless of the position of the shoulder 36 when the cover member 30 comes into contact with the book 42, subsequent operation is the same. With the cover member 30 in contact with the book 42, the user exerts a downward pressure on the handle 35 or left edge of the cover member 30. The downward pressure on the left side of the cover member 30 causes the contact point of the book 42 with the cover member 30 to act as a fulcrum, forcing the right side of the cover member 30 upward. Upward movement of the right side of the cover member 30 causes the arm link 32 to pivot counterclockwise about the secondary pivot pin 41.

The user normally exerts a downward pressure on the left side of the cover member 30 until the cover member 30 is substantially parallel with the platen surface 22. This will result in the greatest degree of radiation protection for the user, and will also exert a uniform downward pressure on the book 42, helping to keep it in place during the copying cycle, forcing its exposed pages firmly into contact with the platen. When the cover 30 is raised and the book 42 is removed, the arm link 32 will pivot clockwise about the secondary pivot pin 41 under the influence of gravity, the cover member 30 will pivot about the primary pivot pin 40, and the entire cover assembly 23 will return to its initial closed position as illustrated in FIG. 4.

ALTERNATE EMBODIMENT

Figure 5:
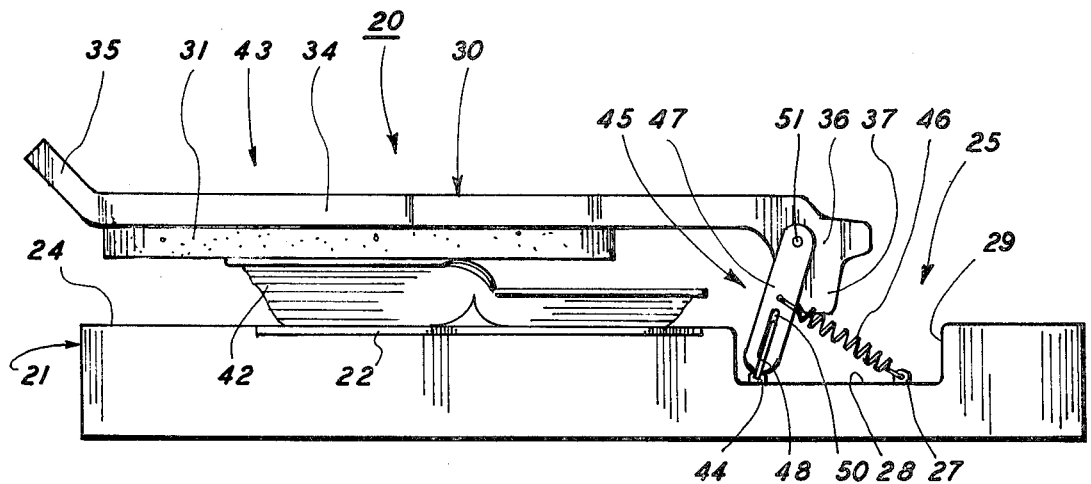
FIG. 5 is a side elevational view of a different embodiment a copying apparatus cover and document keep device similar to that shown in FIG. 1 illustrating its closed thick-document position.
Figure 6:
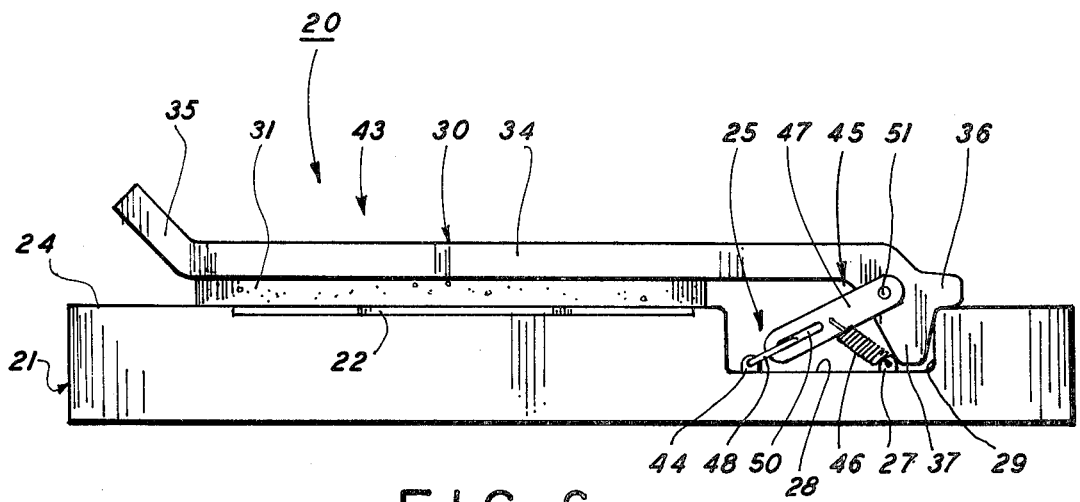
FIG. 6 is a side elevational view of the copying apparatus cover and document keep device shown in FIG. 5, in its closed thin-document copying position.

FIGS. 5 and 6 illustrate an alternate embodiment of the present invention. FIGS. 5 and 6 illustrate a portion of an electrophotographic copying apparatus 20 comprising a housing 21, a platen surface 22 and a cover assembly 43. The housing 21 incorporates a top surface 24 and a recessed region 25 located near one end of the copying apparatus housing 21. The recessed region 25 comprises a base surface 28 and an outer wall 29. Far and near anchoring tabs 27 and 44 are laterally spaced apart along the base surface 28 of the recessed region 25 near the front edge of the housing 21 with far anchor 27 more distant from the platen surface 22 than near anchor 44. Identical anchoring tabs are also disposed near the rear edge of the housing 21. The platen surface 22 is formed as a part of the top surface 24 of the housing 21 and forms a contiguous substantially flat surface together with the top surface 24.

The cover assembly 43 comprises a rigid cover member 30, a document retaining pad 31, an arm linkage 45 and a spring means 46. The rigid cover member 30 incorporates a substantially flat centrally disposed platen-covering portion 34 and an upwardly slanting handle 35 formed at the left side of the rigid cover member 30 as seen by the user. At the right side of the rigid cover member 30 is formed a horizontally extending shoulder 36 and at least one downwardly extending leg 37. The document retaining pad 31 is made of a compressible foam type material and is mounted to the underside of the rigid cover member 30.

The arm linkage 45 comprises a link member 47 and a bail or loop member 48. The link member 47 is pivotally mounted at one end to the side of the rigid cover member 30 near the shoulder end by pin 51, hereinafter called the primary pivot. The other end of the link member 47 incorporates a slot 50. The loop member 48 is slidably engaged within the slot 50 of the link member 47 and is fixedly pivotally mounted to the near anchor 44. The spring means 46 is shown as a resilient tension coil spring, having one end mounted to an intermediate portion of the link member 47 and having its other end pivotally mounted to the far anchor 27. Identical link and loop members and spring means are similarly disposed near the rear edge of the housing 21.

OPERATION

The operation of the cover assembly 43 is similar to that previously described for cover assembly 23. When a thin original or a single document is to be copied, the user grasps the handle 35 located at the left side of the rigid cover member 30 and exerts an upward pressure. This causes the rigid cover 30 to pivot about the primary pivot of pin 51 from its closed position in FIG. 6, raising the cover member 30 away from the platen surface 22.

As the cover member 30 is pivoted about the pin 51, the horizontal shoulder 36 will cammingly slide along the top surface 24 of the housing 21, with the position as shown in FIG. 1A, causing the arm linkage 45 to pivot counterclockwise about the near anchor 44, with the position as shown in FIG. 1B. This counterclockwise movement of the arm linkage 45 first causes relative sliding extension movement of loop 48 and link 47, and after full extension, further pivoting movement about anchor 44 pulls the entire cover member 30 to the left, causing the shoulder 36 to drop down into the recessed region 25, with the position as shown in FIG. 1C.

Tension of the spring means 46 creates a frictional engagement between the side wall 29 of the recessed region 25 and the shoulder 36 allowing the cover member 30 to remain in a raised position without assistance from the user.

When the rigid cover member 30 is pivoted downward toward engagement with the platen surface 22, the leg 37 will rollingly contact the base 28, causing the shoulder 36 to cammingly slide upward along the side wall 29 of the recessed region 25 with the position as shown in FIG. 1D, until it slips out of the recessed region 25 and the cover 30 returns to its normal closed position as illustrated in FIG. 6.

When a page of a book 42 or a thick original document is to be copied, the cover member 30 is pivoted upward from its closed position in FIG. 6 until the document can be placed on the platen surface 22 in the position shown in FIG. 5. The cover 30 is then pivotally lowered until it is in contact with the book 42. The user then exerts a downward pressure on the left side of the cover member 30 with the contact point between the book 42 and the cover 30 acting as a fulcrum. This downward pressure on the left side of the cover member 30 causes the right side to be forced upward.

Upward movement of the right side of the cover member 30 causes the arm linkage 45 to pivot in a counterclockwise direction about the near anchor 44. Further upward movement of the right side of the cover 30 continues with sliding relative movement of the link member 47 and a loop member 48 within the slot 50 until the cover 30 is substantially parallel with the platen surface 22. When the book 42 is removed, the spring means 46 causes the cover member 30 to return to its normal closed position as illustrated in FIG. 6.

The operation of the cover assembly 23 is therefore quite similar to the operation of the cover assembly 43 in both the thin document and thick document reproduction mode. During thick document copying, the cover member 30 of the cover assembly 23 returns to its closed position by the force of gravity, while the cover member 30 of the cover assembly 43 returns to its closed position with the additional aid of the spring means 46.

It will thus be seen that the objects set forth above among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

We claim:

1. A cover and original document keep device for a copying apparatus having a housing and a platen surface comprising:
   (A) means forming a recessed base region in the copying apparatus housing adjacent to the platen surface and incorporating fixed first and second anchor means formed therein,
   (B) a unitary cover member comprising:
      (1) a substantially flat portion, disposed over the platen surface,
      (2) one end forming a cover supporting means, and
      (3) the other end forming a cover raising and lowering handle means,
   (C) a cover positioning system comprising:
      (1) sliding link means, having one end pivotally mounted to the first anchor means formed in the recessed base region and having the other end pivotally mounted to the unitary cover member near its supporting means, and
      (2) spring means operatively connected between the link means and the second anchor means to urge the sliding link means toward the second anchor means formed in the recessed base region,
   (D) with the cover supporting means frictionally engaging the housing in the pivotally raised position of the cover member,
   whereby the cover member cooperates with the sliding pivotal link means to allow the cover member to remain substantially parallel with the platen surface in order to accommodate both thin and thick original documents for copying and alternatively to allow the cover member to be pivotally raised above the platen surface and whereby cooperation of the cover positioning system, the cover supporting means and the copying apparatus housing maintains the cover member in the pivotally raised position.

2. The cover and original document keep device for a copying apparatus defined in claim 1, wherein the pivotally mounted link means incorporates first and second independent pivot points defining first and second pivotal axes, where the unitary cover member pivots about the first pivot point and where the combination of the link means and unitary cover pivots about the second pivot point, whereby compound pivoting about the first and second pivot points allows the cover member to remain substantially parallel with the platen surface in order to accommodate both thin and thick documents for copying and alternately to allow the cover member to be pivotally raised above the platen surface.

3. The cover and original document keep device for a copying apparatus defined in claim 1, wherein the cover supporting means comprises at least one extending shoulder member and at least one extending leg member, whereby cooperation of the cover positioning system, said shoulder and leg members and the copying apparatus housing maintains the cover member in the pivotally raised position.

4. The cover and original document keep device for a copying apparatus defined in claim 1, wherein the spring means comprises a tension coil spring.

5. The cover and original document keep device defined in claim 1, wherein the unitary cover member incorporates a compressible foam-type pad mounted between the cover member and the platen surface for operably contacting the original document to be copied, thereby preventing any document slippage during copying.

6. The cover and original document keep device for a copying apparatus defined in claim 1, wherein the recessed base region incorporates a side wall structure, whereby the cover member is maintained in the pivotally raised position through frictional engagement between the cover supporting means and said side wall structure.

7. A cover and original document keep device for a copying apparatus having a housing and a platen surface comprising:
(A) means forming a recessed base region in the copying apparatus housing adjacent to the platen surface and incorporating a slotted first anchor means and a second anchor means formed therein,
(B) a unitary cover member comprising:
(1) a substantially flat portion, disposed over the platen surface,
(2) one end forming a cover supporting means, and
(3) the other end forming a cover raising and lowering handle means,
(C) a cover positioning system comprising:
(1) unitary link means, having one end slidingly pivotally mounted to the slotted first anchor means formed in the recessed base region and having the other end pivotally mounted to the unitary cover member near its supporting means; and
(2) spring means operatively connected between the unitary link means and the second anchor means formed in the recessed base region to urge the sliding link means toward the second anchor means,
(D) with the cover supporting means frictionally engaging the housing in the pivotally raised position of the cover member,
whereby the cover member cooperates with the sliding pivotal link means to allow the cover member to remain substantially parallel with the platen surface in order to accommodate thick original documents for copying and alternatively to allow the cover member to be pivotally raised above the platen surface and whereby cooperation of the cover positioning system, the cover supporting means and the copying apparatus housing maintains the cover member in the pivotally raised position.

8. A cover and original document keep device for a copying apparatus having a housing and a platen surface comprising:
(A) means forming a recessed base region in the copying apparatus housing adjacent to the platen surface and incorporating fixed first and second anchor means formed therein,
(B) a unitary cover member comprising:
(1) a substantially flat portion, disposed over the platen surface,
(2) one end forming a cover supporting means, and
(3) the other end forming a cover raising and lowering handle means,
(C) a cover positioning system comprising:
(1) a slidingly extensible link means, having one end pivotally mounted to the first anchor means formed in the recessed base region and having the other end pivotally mounted to the unitary cover member near its supporting end; and
(2) spring means operatively connected between the extensible link means and the second anchor means formed in the recessed base region to urge the link means toward the second anchor means,
(D) with the cover supporting means frictionally engaging the housing in the pivotally raised position of the cover member,
whereby the cover member cooperates with the slidingly extensible link means to allow the cover member to remain substantially parallel with the platen surface in order to accommodate thick original documents for copying and alternatively to allow the cover member to be pivotally raised above the platen surface and whereby cooperation of the cover positioning system, the cover supporting means and the copying apparatus housing maintains the cover member in the pivotally raised position.

* * * * *